United States Patent
Birkelbach

(10) Patent No.: US 6,722,833 B2
(45) Date of Patent: Apr. 20, 2004

(54) SELF-THREADING SCREW WITH STRAIGHT LOAD FLANK AND ANGLED REAR FLANK PROFILE

(75) Inventor: Ralf Birkelbach, Marburg (DE)

(73) Assignee: EJOT Verbindungstechnik GmbH & Co. KG, Bad Laasphe (DE)

( * ) Notice: Subject to any disclaimer, the term of this patent is extended or adjusted under 35 U.S.C. 154(b) by 326 days.

(21) Appl. No.: 09/913,158

(22) PCT Filed: Dec. 14, 2000

(86) PCT No.: PCT/EP00/12741
§ 371 (c)(1),
(2), (4) Date: Apr. 26, 2002

(87) PCT Pub. No.: WO01/44672
PCT Pub. Date: Jun. 21, 2001

(65) Prior Publication Data
US 2002/0136616 A1 Sep. 26, 2002

(30) Foreign Application Priority Data
Dec. 14, 1999 (DE) .......................... 199 60 287

(51) Int. Cl.$^7$ ............................................. F16B 25/04
(52) U.S. Cl. ...................................................... 411/411
(58) Field of Search ................. 411/411, 414, 411/386, 387.1–387.8, 308–311

(56) References Cited

U.S. PATENT DOCUMENTS

| 4,576,534 | A | | 3/1986 | Barth et al. |
| 5,061,135 | A | * | 10/1991 | Pritchard |
| 5,570,983 | A | * | 11/1996 | Hollander |
| 5,947,670 | A | * | 9/1999 | Larson |
| 6,158,939 | A | | 12/2000 | Grossberndt et al. |

FOREIGN PATENT DOCUMENTS

| DE | 3235352 | * | 3/1984 |
| DE | 3926000 | | 8/1989 |
| DE | 9302186 | | 4/1993 |
| DE | 19732652 | | 2/1999 |
| EP | 589398 | | 3/1994 |
| GB | 211257 | | 2/1924 |

* cited by examiner

Primary Examiner—Flemming Saether
(74) Attorney, Agent, or Firm—Banner & Witcoff, Ltd.

(57) ABSTRACT

Self-tapping screw with rolled thread turns, on which the angle bisector of the thread turn formed by the load flank and the rear flank slopes away from the screw head at an angle to the perpendicular to the screw axis, the load flank running in a straight line to the thread root, and the rear flank initially extending in a straight line from the thread tip and, at about ⅓ of its height, merging via a kink into a straight angled portion at an angle that is greater than the angle, measured relative to the perpendicular, of the rear flank and is between 30° and 50°, the ratio of the thread's core diameter to the thread's outside diameter being greater than 0.7 and the ratio of the thread pitch to the thread's outside diameter being less than 0.25.

6 Claims, 1 Drawing Sheet

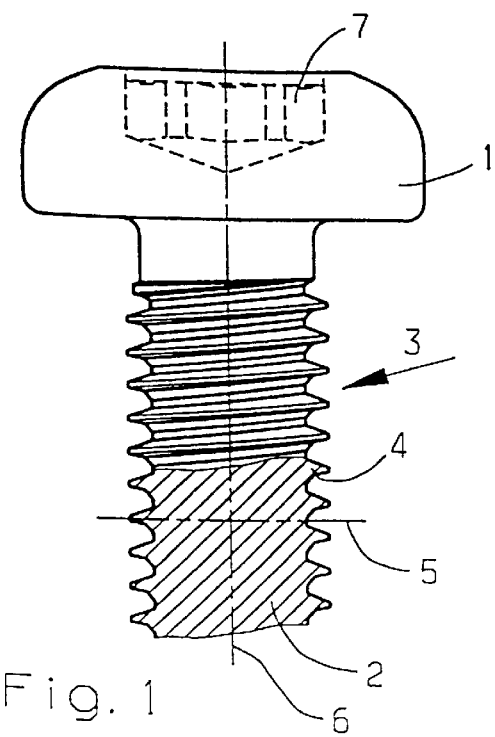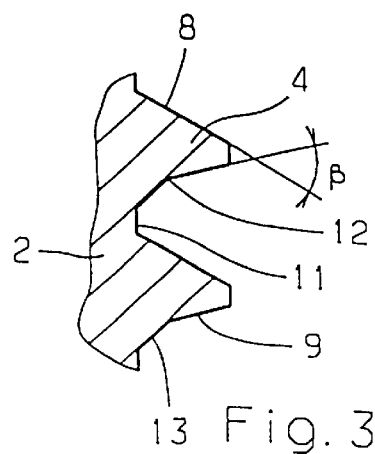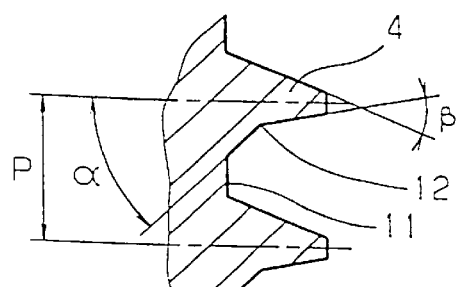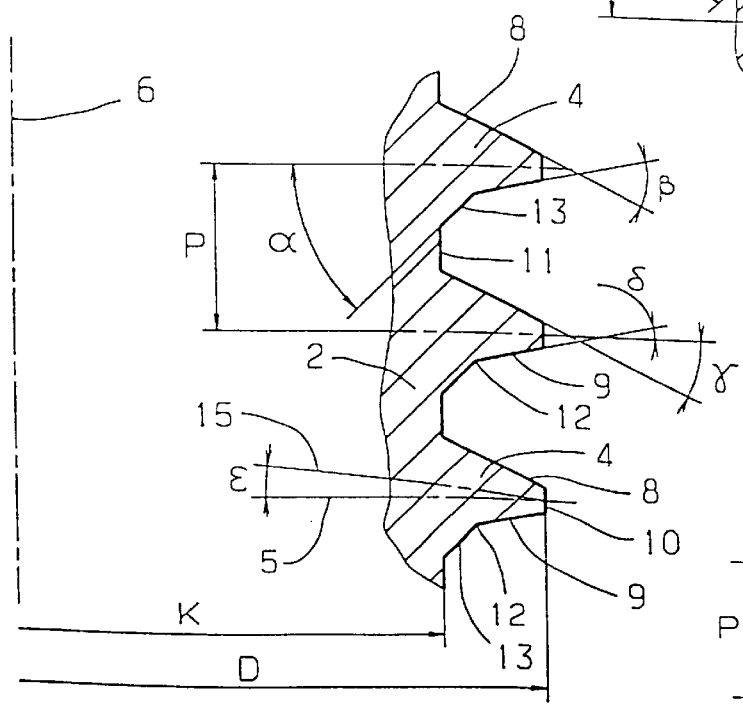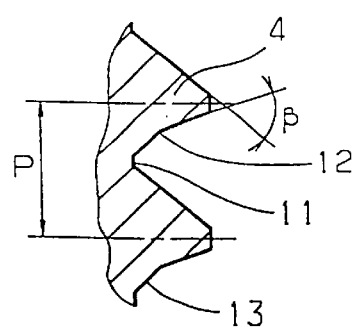

SELF-THREADING SCREW WITH STRAIGHT LOAD FLANK AND ANGLED REAR FLANK PROFILE

FIELD OF THE INVENTION

The invention relates to a self-tapping screw with rolled thread turns, on which the angle bisector of the thread turn formed by the load flank and the rear flank slopes away from the screw head at an angle to the perpendicular to the screw axis.

BACKGROUND OF THE INVENTION

A screw of this kind is known from European Patent Application 501 519. The special feature of this known screw is that both the load flank (the thread flank facing the screw head) and the rear flank (the flank opposite to the load flank) of its thread turns run into the thread root via rounded portions. This rounded configuration is presented as being advantageous in the introduction to the publication, in contrast to DE-A 32 35 352 cited therein. In the case of the subject-matter of this DE-A 32 35 352, the transition between the flank profile and the core region of the thread is of discontinuous design, this transition consisting namely of a kink. In contrast, DE-A 32 07 975, which is also cited in the European patent application, furthermore discloses a self-tapping screw where the flank angle of the thread turns increases continuously from the flank tip to the thread root, this being intended to promote damage-free deformation of the plastic in which the screw concerned is to be screwed. In addition, the European patent application points out in relation to the screw from DE-A 32 07 975 that, in the case of the screw described there, which is intended to be screwed into plastic, the thread turns are not asymmetrical, i.e. the angle bisector between the load flank and the rear flank of the thread turns is perpendicular to the screw axis.

A self-tapping screw created for use preferably with particle board is furthermore known from European Patent Application 713 017, in which the cross section of the thread turns has a kink in the region of the load flank, such that the load flank runs at a larger angle relative to the perpendicular to the screw axis after the kink from the direction of the thread tip. Moreover, in the case of this screw, the angle bisector between the load flank and the rear flank slopes towards the screw head in the region between the thread tip and the kink. As a result, the thread turns of this screw form a bearing surface that is close to the perpendicular when tightened or subjected to load, the thread turn bearing particularly heavily against material in the relevant component as the said material presses against it. As a consequence, the individual thread turns are subjected to bending stress by forces that run virtually parallel to the thread axis, considerably reducing the loading capacity of this screw.

Self-tapping screws disclosed in European Patent Application 133773 and DE-A 36 15 271 have a similar configuration since, with these known screws, the forces acting on the thread turns when a load is imposed are virtually parallel to the screw axis in the region between the thread tip and a kink in the load flank. This is particularly marked in the case of the screw disclosed in DE-A 36 15 271, in which the load flank runs perpendicular to the screw axis in the region between the thread tip and the kink. The two known screws are thus particularly sensitive when being tightened and hence to high bending loads on the thread turns.

SUMMARY OF THE INVENTION

The object on which the invention is based is to configure the screw described at the outset in such a way as to improve its production by thread rolling and furthermore to increase its load-bearing capacity and holding strength. At the same time, the geometric configuration of the screw is to be chosen in such a way as to ensure optimum screw-in performance in the respective metallic material.

According to the invention, this is accomplished by the fact that the load flank runs in a straight line to the thread root, and the rear flank initially extends in a straight line from the thread tip and, at about ⅓ of its height, merges via a kink into a straight angled portion at an angle that is greater than the angle, measured relative to the perpendicular, of the rear flank and is between 30° and 50°, the ratio of the thread's core diameter to the thread's outside diameter being greater than 0.7 and the ratio of the thread pitch to the thread's outside diameter being less than 0.25.

By virtue of the essentially rectilinear profile from the thread tips to the thread root in the region of the load flank and of the kink in the rear flank, the screw can be rolled with rolling dies whose grooves each have a corresponding rectilinear profile in cross section, a considerable advantage over rolling dies that are rounded in this area when it comes to the production of the rolling dies. Moreover, it has been found that the dimensioning that results when the ratio of the thread's core diameter to the thread's outside diameter is greater than 0.7 leads to a shortening of the thread turns, with the result that these are subjected to bending loads over only a relatively small radial height when the screw is tightened and when subjected to loading by the component concerned, these loads furthermore being taken in an effective manner by virtue of the fact that the angled portion extends over the region that requires firm support against buckling for the thread turns. At the same time, the fact that the kink starts at only about ⅓ of the height of the thread turns means that there is sufficient space at the outside of the thread turns to allow the displaced material from the component concerned to flow away, and this process of flowing away is therefore not impaired.

Owing to the continuously straight sloping profile of the load flank of the thread turns, the force that is exerted on this flank when the screw is tightened is introduced at a correspondingly oblique angle into the screw and hence its core because of the slope of the load flank and, because of its relatively large diameter, the core is capable of absorbing large forces. Conversely, the pressure in the material of the component is likewise directed at an oblique angle, i.e. into the material surrounding the location at which the screw is screwed in, where this pressure can be readily absorbed. At the same time, the rectilinear slope of the load flank enables uniform pressure distribution over the entire height of the thread's load flank, thereby always allowing a maximum area of contact and maximum friction during tightening of the screw without damaging the material. By virtue of the ratio of the thread pitch to the thread's outside diameter, which is chosen to be less than 0.25, the thread obtained has closely spaced thread turns, with the result that a relatively large number of thread turns is anchored in the component concerned over a given length. This results in correspondingly high tear-out and holding forces.

The angle between the angle bisector (between the load flank and the rear flank) and the perpendicular to the screw axis is advantageously chosen in such a way as to be between 5° and 15°. The resulting slope of the thread turns leads to an adequate slope of the load flank, even in the case of small flank angles (measured between the load flank and the rear flank), with the result that forces acting on the load flank are introduced into the core of the screw in a favourable manner. The slope and the straight profile of the load flank are thus responsible for the friction between the screw screwed in and the component, which must be sufficiently large to ensure that the overturning torque, at which the screw would strip the thread in the component, is not reached too easily.

The screw according to the invention is particularly suitable for screwing into steel, for which purpose the screw itself is naturally likewise composed of steel. In this case, a flank angle between the load flank and the rear flank of 38° to 48° has proven advantageous since this gives an optimum relationship between the displaced volume and stress-bearing capacity of the material. If the steel screw according to the invention is screwed into light alloy, a flank angle between the load flank and the rear flank of 32° to 42° is expedient in this case.

It is also possible to make the screw from aluminium, in particular a hard aluminium alloy, which is then likewise suitable for screwing into light alloy. In this case, the selected flank angle between the load flank and the rear flank is expediently between 58° and 68°.

The slope of the angle bisector is particularly favourable if it is chosen to be about ⅙ of the flank angle between the load flank and the rear flank.

BRIEF DESCRIPTION OF THE DRAWINGS

Exemplary embodiments of the invention are illustrated in the figures, in which:

FIG. 1 shows a screw with a screw head and a self-tapping thread,

FIG. 2 shows a section through part of the thread in FIG. 1 in enlarged representation, FIG. 3 shows a section through the thread similar to that in FIG. 2 with a flank angle of 45°, FIG. 4 shows a section at a similar angle through a thread with a flank angle of 33°, FIG. 5 shows a section through a thread with a flank angle of 60°.

DETAILED DESCRIPTION OF THE PREFERRED EMBODIMENTS

FIG. 1 shows a self-tapping screw with a screw head 1 and the core 2, into which the thread 3 has been rolled. The thread concerned has a single start with the individual thread turns 4, which slope away from the screw head 1 at an angle to the perpendicular 5 to the screw axis 6. A screw-driving means 7 has been stamped into the screw head 1 and is of known configuration.

In FIG. 2, the thread 3 from FIG. 1 is shown in section in enlarged representation. The individual thread turns 4 have the load flank 8, which faces towards the screw head 1, and the opposite rear flank 9. The load flank 8 extends in a straight line from the thread tip 10 to the thread root 11. The rear flank 9 opposite to the load flank 8 merges via the kink 12 into the angled portion 13. The load flank 8 with its flank angle γ and the rear flank 9 with its flank angle δ, each in relation to the perpendicular 5, form the flank angle β, which in this case is 39°. The angle bisector 15 of the flank angle β, which essentially determines the slope of the thread turns 4, forms the angle ε relative to the perpendicular 5. In relation to the perpendicular 5 to the screw axis 6, the angled portion 13 runs at an angle α, which is larger than the rear flank angle δ, measured between the perpendicular 5 and the rear flank 9.

Also entered in FIG. 2 are the pitch P (distance between two adjacent thread turns 4), the outside diameter D of the thread and the core diameter K of the thread. In the case of the thread illustrated in FIG. 2, the ratio of the thread's core diameter K to the thread's outside diameter D is 0.8, while the ratio of the thread pitch P to the thread's outside diameter D is 0.17. In this case, the flank angle β is 39°.

FIGS. 3 to 5 show variants of the thread in FIG. 2. In the case of the thread shown in FIG. 3, the flank angle β is 45°, in the case of the thread shown in FIG. 4, the flank angle β is 33° and, in the case of the thread shown in FIG. 5, the flank angle β is 60°.

As regards the configuration of the threads shown in FIGS. 2 to 4, it should furthermore be noted that the thread root 11 is in each case cylindrical.

It should furthermore be noted that the exemplary embodiments of threads shown in enlarged representation in FIGS. 2 to 5 represent ranges of favourable flank angles β that can be used for particular applications, as explained in detail above. In the case of the thread shown in FIGS. 2 to 5, the kink 12 in the region of the rear flank 9 is at ⅓ of the height of the thread turns 4, this height being measured from the thread root 11 in the direction of the thread tip 10. In the case of the thread shown in FIGS. 2 to 5, the angled portion 13 starting from the kink 12 runs at an angle α (see FIG. 2), which is 45°.

What is claimed is:

1. A self-tapping screw having a screw head and a screw tip defining a longitudinal screw axis, said screw including a plurality of rolled thread turns extending along said screw axis defining a thread pitch between adjacent ones of said turns, an angle bisector of each turn sloping away from said screw head at a perpendicular to said screw axis, each turn comprising:

a thread root defining a core diameter;

a thread tip defining an outside diameter;

a load flank; and a rear flank which slopes away from said screw head at an angle δ with respect to the perpendicular to said screw axis, said angle δ being between 30° and 50°;

wherein said load flank runs in a straight line to said threat root and defines an angle γ with respect to the perpendicular of said screw axis, and said rear flank extends in a first straight line portion from said thread tip and at approximately ⅓ of its height merges via a kink into a second straight line portion angled relative to said first straight line portion at an angle α, angle α being greater than angle δ, the ratio of said core diameter to said outside diameter being greater than 0.7, and the ratio of said threat pitch to said outside diameter being less than 0.25.

2. The screw of claim 1, wherein the slope of the angle bisector is between 5° and 15°.

3. The screw of claim 2, wherein the slope of the angle bisector is about ⅙ of an angle β between said load flank and said rear flank where β=δ+γ.

4. The screw of claim 3, wherein said angle β is between 38° and 48°.

5. The screw of claim 3, wherein said angle β is between 32° and 42°.

6. The screw of claim 3, wherein said angle β is between 58° and 68°.

* * * * *